United States Patent
Mogami et al.

(10) Patent No.: US 7,423,071 B2
(45) Date of Patent: Sep. 9, 2008

(54) POLYPROPYLENE BASED RESIN COMPOSITION, EXPANDED MOLDINGS COMPRISING THE SAME AND METHOD FOR PRODUCTION THEREOF

(75) Inventors: Kenji Mogami, Settsu (JP); Ryoji Nakayama, Settsu (JP)

(73) Assignee: Kaneka Corporation, Osaka-Shi (JP)

( * ) Notice: Subject to any disclaimer, the term of this patent is extended or adjusted under 35 U.S.C. 154(b) by 127 days.

(21) Appl. No.: 10/570,670

(22) PCT Filed: Aug. 12, 2004

(86) PCT No.: PCT/JP2004/011872

§ 371 (c)(1),
(2), (4) Date: Mar. 6, 2006

(87) PCT Pub. No.: WO2005/026255

PCT Pub. Date: Mar. 24, 2005

(65) Prior Publication Data

US 2007/0032600 A1 Feb. 8, 2007

(30) Foreign Application Priority Data

Sep. 12, 2003 (JP) ............................. 2003-321711
Feb. 23, 2004 (JP) ............................. 2004-045562
Mar. 15, 2004 (JP) ............................. 2004-072162
Mar. 15, 2004 (JP) ............................. 2004-072171

(51) Int. Cl.
*B29C 44/34* (2006.01)

(52) U.S. Cl. .................. 521/142; 521/59; 521/140; 428/318.8

(58) Field of Classification Search ............... 521/142
See application file for complete search history.

(56) References Cited

U.S. PATENT DOCUMENTS

| | | | |
|---|---|---|---|
| 4,818,451 A * | 4/1989 | Arai et al. | 264/40.3 |
| 6,040,348 A | 3/2000 | Delaite et al. | |
| 6,262,138 B1 * | 7/2001 | Miyama et al. | 521/139 |
| 6,875,484 B1 * | 4/2005 | Kogure et al. | 428/34.1 |
| 2002/0017734 A1 * | 2/2002 | Sugihara et al. | 264/51 |
| 2004/0186237 A1 * | 9/2004 | Kagami et al. | 525/240 |
| 2006/0051543 A1 * | 3/2006 | Imanari et al. | 428/35.7 |

FOREIGN PATENT DOCUMENTS

| | | |
|---|---|---|
| JP | 4-351648 | 12/1992 |
| JP | 11-12323 | 1/1999 |
| JP | 11-35719 | 2/1999 |
| JP | 11-35723 | 2/1999 |
| JP | 11-35724 | 2/1999 |
| JP | 11-92584 | 4/1999 |
| JP | 11-116724 | 4/1999 |
| JP | 2001047537 A * | 2/2001 |

OTHER PUBLICATIONS

International Search Report dated Nov. 30, 2004 of PCT/JP2004/011872.
English translation of International Preliminary Report on Patentability of PCT/JP2004/011872 mailed on Jun. 29, 2006.

* cited by examiner

*Primary Examiner*—Mark Eashoo
*Assistant Examiner*—Melissa Winkler
(74) *Attorney, Agent, or Firm*—Westerman, Hattori, Daniels & Adrian, LLP.

(57) ABSTRACT

A polypropylene-based resin composition for injection foam molding, containing (A) 50 to 95 parts by weight of a linear polypropylene-based resin having a melt flow rate of from 10 g/10 min. to 100 g/10 min. and a melt tension of 2 cN or less and (B) 5 to 50 parts by weight of a modified polypropylene having a melt flow rate of from 0.1 g/10 min. to less than 10 g/10 min. and a melt tension of 5 cN or more and exhibiting a strain hardening property (provided that a total of the resin (A) and the resin (B) is 100 parts by weight) and a foaming agent are supplied to an injection molding machine to be injected into a die, thereby achieving a foam molding. It is thus possible to obtain a injection foamed molded article which has a satisfactory injection foam moldability, a skin layer having little silver streaks or the like on its surface, and an internal core layer having a foam of high expansion ratio and uniformly fine and a excellent appearance glossiness, lightweightness, and rigidity at a low cost.

6 Claims, No Drawings

POLYPROPYLENE BASED RESIN COMPOSITION, EXPANDED MOLDINGS COMPRISING THE SAME AND METHOD FOR PRODUCTION THEREOF

RELATED APPLICATION

This application is a national stage of PCT application No. PCT/JP2004/011872 filed on Aug. 12, 2004, claiming priority based on Japanese Applications No. 2003-321711 filed on Sep. 12, 2003, No. 2004-045562 filed on Feb. 23, 2004, No. 2004-072162 filed on Mar. 15, 2004 and No. 2004-072171 filed on Mar. 15, 2004, the contents of which are incorporated herein by reference in their entirety.

TECHNICAL FIELD

The present invention relates to a polypropylene-based resin composition suitable for injection foam molding, a foamed molded article made from the same, and a process for preparing the same.

BACKGROUND ART

In injection moldings of polypropylene-based resins, a so-called injection foam molding wherein foaming is conducted for the purpose of reducing weight and cost as well as of preventing warping and shrinkage of a molded article has heretofore been employed. However, since the polypropylene-based resin is crystalline and has a low melt tension, a surface of a molded article has been subject to an appearance defect called silver streaks (or swirl mark) due to a breakage of cells during foaming, and it has been difficult to increase an expansion ratio due to an occurrence of an internal void and the like. Further, a rigidity of the molded article has not been sufficient since the cells are non-uniform and large in size.

As a method of improving a foamability, a method of increasing a melt tension of a polypropylene-based resin by adding a cross-linking agent or a silane grafted thermoplastic resin has been proposed (JP-A-61-152754, JP-A-7-109372, for example). Though it is possible to obtain a foamed molded article having a high expansion ratio with the method, a viscosity at the time of melting is increased too much by the method to make it difficult to perform the injection molding, thereby deteriorating a surface property of the obtained molded article.

Also, a polypropylene having a higher melt tension as compared with ordinary linear polypropylene-based resins owing to an introduction of a long chain branch by irradiation with radioactive rays and a so-called strain hardening property which is a property of increasing a viscosity along with an increase in drawing strain of a melted substance has been offered commercially by SunAllomer, Ltd. as HMS-PP (High Melt Strength Polypropylene) (JP-A-121704). It is possible to prepare the HMS-PP having the strain hardening property by melt-kneading a polypropylene-based resin, an isoprene monomer, and a radical polymerization initiator (JP-A-9-188774). It is known that a molded article is obtainable through an injection foam molding using such HMS-PP as a base material resin (JP-A-2001-26032). However, the HMS-PP used in the injection foam molding has a melt flow rate of about 4 g/10 min. and is low in fluidity in melting, thereby causing a short shot in molding using a die cavity whose clearance having a thin portion of about 1 to 2 mm. In turn, another HMS-PP which is known to have a higher melt flow rate (30 g/10 min.) makes it difficult to obtain a foamed molded article having a high expansion ratio since a melt tension thereof is only about 0.3 cN though the HMS-PP exhibits the strain hardening property. Further, since an expensive radiological installation is used for the preparation of the above HMS-PPs, the thus-prepared HMS-PPs inevitably become expensive, and it is difficult to provide products obtained therefrom at low prices.

Also, a polypropylene-based resin which is mixed with polyethylene having a specific limiting viscosity to achieve a high melt flow rate and a high melt tension (JP-A-2003-128854) and a method of using a mixture of a polypropylene-based resin which contains a component having a specific limiting viscosity by multi-stage polymerization and has a high melt tension and a polypropylene-based resin having a high melt flow rate for injection foam molding have been proposed (JP-A-2003-268145). However, since the above polypropylene-based resins do not exhibit the remarkable strain hardening property achieved by the HMS-PP having the long chain branch, cells are broken in the case of a high expansion ratio exceeding 2 to be subject to generation of voids, thereby failing to meet the needs of high rigidity and light weight.

As a method of obtaining a foamed molded article having a satisfactory surface appearance, a method of maintaining a pressure inside a die cavity at a value capable of preventing foaming in advance is known (JP-A-9-227425, JP-A-5-269778). However, each of the foamed molded articles obtained by the methods has a low expansion ratio of less than 2, and no example of a foamed molded article having a higher expansion ratio is disclosed in the literatures. Further, JP-A-2002-192549 discloses a process of producing an injection foamed molded article having a glossy appearance and a layer of a high expansion ratio of 1.1 to 4.0 by injecting a melt resin into which carbon dioxide has been dissolved into a die cavity maintained at a pressure for preventing foaming at a flow front of the melt resin, and forming a surface layer by pressing the melt resin against a wall of the die, followed by retrieving a movable die. Though it is possible to produce foamed molded articles having an expansion ratio of 2 or more and an glossy appearance according to the above method, a relatively high pressure (e.g. 7 MPa) is required for the preliminary pressurizing of the die, so that a pressurizer capable of enduring the high pressure is required and it is necessary to bestow much care on a sealing structure of the die. Further, the increase in pressure for the die preliminary pressurizing causes adverse effects on the foaming since a gas tends to be left inside the die when the gas is withdrawn from the die for foaming and entails the necessity of bestowing much care on timing and a method of the gas withdrawal as well as a problem of lacking in stability. Also, though examples of polystyrene and polycarbonate are disclosed in the literature, no specific example of polypropylene is disclosed in the literature.

Also, in the case of combining the above surface improving methods and the polypropylene-based resin improved in foamability, it has been difficult to obtain a polypropylene-based resin foamed molded article which is capable of maintaining a fluidity at a thin portion and excellent in surface property with a high expansion ratio of 2 or more.

In addition, though methods of improving the surface property, such as coating on a surface of a molded article, pasting a surface material on the surface, and the like have heretofore been proposed, automakers, in particular, demand omission of these methods in view of environment pollution, recycle, and cost reduction.

As described in the foregoing, it has been difficult to obtain a polypropylene-based resin injection foamed molded article which is satisfactory in injection foam molding property and high in an expansion ratio and has a remarkably light weight, a glossy surface appearance, and an excellent rigidity.

DISCLOSURE OF THE INVENTION

An object of the present invention is to provide a polypropylene-based resin composition for injection foam molding, which has a satisfactory injection foam molding property and a high expansion ratio and enables to obtain a foamed molded article having a glossy appearance, a reduced weight, and a rigidity at a low cost, a foamed molded article made from the polypropylene-based resin composition, and a process for preparing the polypropylene-based resin composition More specifically, this invention relates to a polypropylene-based resin composition for injection foam molding, comprising: (A) 50 to 95 parts by weight of a linear polypropylene-based resin having a melt flow rate of from 10 g/10 min. to 100 g/10 min. and a melt tension of 2 cN or less; and (B) 5 to 50 parts by weight of a modified polypropylene having a melt flow rate of from 0.1 g/10 min. to less than 10 g/10 min. and a melt tension of 5 cN or more and exhibiting a strain hardening property (provided that a total of the linear polypropylene-based resin (A) and the modified polypropylene-based resin (B) is 100 parts by weight).

A preferred embodiment thereof relates to the above-described polypropylene-based resin composition for injection foam molding, wherein the modified polypropylene-based resin (B) is obtained by melt-mixing a linear polypropylene-based resin, a radical polymerization initiator, and a conjugated diene compound.

According to a second aspect of this invention, the invention relates to a foamed molded article comprising the above-described polypropylene-based resin composition for injection foam molding. A preferred embodiment thereof relates to the foamed molded article, the foamed molded article comprising: a foamed layer having an average cell diameter of 500 μm or less, a non-foamed layer formed on a surface of at least one side of the foamed layer and having a thickness of from 10 μm to 1,000 μm;
and said foamed molded article having an expansion ratio of from 2 to 10, and a thickness of 30 mm or less.

According to a third aspect of this invention, this invention relates to a process for preparing the above described foamed molded article, wherein the polypropylene-based resin composition for injection foam molding and the foaming agent are supplied to an injection molding machine and then injected into a die for a foam molding. A preferred embodiment thereof relates to the process for preparing the foamed molded article, using a die comprising a fixed die and a movable die capable of advancing and retrieving to arbitrary positions and foaming with the movable die being retrieved after the injection, and another preferred embodiment thereof relates to the process for preparing the polypropylene-based resin foamed molded article, wherein the foam-molding is performed by injecting a melt mixture into a die which is pressurized with a gaseous substance to a pressure preventing from foaming at a flow front of the melt mixture and the melt mixture comprises:
(A) 50 to 95 parts by weight of the linear polypropylene-based resin having the melt flow rate of from 10 g/10 min. to 100 g/10 min. and the melt tension of not more than 2 cN;
(B) 5 to 50 parts by weight of the modified polypropylene having the melt flow rate of from 0.1 g/10 min. to less than 10 g/10 min. and the melt tension of 5 cN or more and exhibiting a strain hardening property (provided that a total of the linear polypropylene-based resin (A) and the modified polypropylene-based resin (B) is 100 parts by weight); and a foaming agent. A further preferred embodiment thereof relates to the method for producing the polypropylene-based resin foamed molded article, wherein the pressure for pressurizing the die in advance of the injection of the melt mixture is from 0.1 MPa to 5 MPa.

Since the polypropylene-based resin composition for injection foam molding of this invention is high in fluidity in melting and melt tension, the polypropylene-based resin composition attains satisfactory injection foam moldabilities. Further, by performing a foam molding by supplying the polypropylene-based resin composition and a foaming agent to an injection molding machine to melt them in the injection molding machine and then injecting the melt polypropylene-based resin composition into a die which has preferably been pressurized to a pressure preventing foaming at a flow front of the melt polypropylene-based resin composition, it is possible to obtain a foamed molded article having a skin layer having little silver streaks on its surface and an internal foamed layer, i.e. a core layer, having a high expansion ratio and uniformly fine foam. Therefore, the foamed molded article has a remarkably glossy appearance and is excellent in light weight and rigidity. Since the modified polypropylene-based resin which is relatively expensive is diluted with the linear polypropylene-based resin which is relatively cheap, it is possible to provide such high quality foamed molded article easily and at a low cost.

BEST MODE FOR CARRYING OUT THE INVENTION

The polypropylene-based resin composition for injection foam molding of this invention is characterized by using two types of polypropylene-based resins (A) and (B) which are different in melt flow rate and melt tension from each other.

The linear polypropylene-based resin (A) used in this invention may have a melt flow rate of from 10 g/10 min. to 100 g/10 min., preferably from 15 g/10 min. to 50 g/10 min. as well as a melt tension of 2 cN or less, more preferably 1 cN or less. With the melt flow rate and the melt tension in the above ranges, a short shot hardly occurs even in a molding where a clearance of a die cavity has a thin portion of about 1 to 2 mm in the case of manufacturing an injection foamed molded article, thereby achieving continuous and stable moldings, preventing cells from being destroyed during foaming, achieving a high expansion ratio, and enabling to obtain a foamed molded article having a satisfactory transcribing property and a glossy surface appearance.

The melt flow rate was measured at 230° C. and under a load of 16 kg in accordance with ASTM D-1238, and the melt tension means a withdrawal load applied on a pulley with a load cell when the strand was broken, which was measured by using a capirograph (product of Toyo Seiki Seisaku-Sho, Ltd.) with an attachment for melt tension measurement and in such a manner that a strand depressed at a piston speed of 10 mm/min. was withdrawn from a dice having a diameter of φ1 mm and a length of 10 mm at 230° C. at a speed of 1 m/min. with a withdrawal speed being increased at a rate of 40 m/min.$^2$ after stabilization until the strand was broken.

As used herein, the linear polypropylene-based resin (A) means a polypropylene-based resin having a linear molecular structure, which is obtainable by an ordinary polymerization method such as a polymerization under the presence of a catalyst system (e.g. Ziegler-natter catalyst) obtainable from a transition metal compound supported by a carrier and an organic metal compound. Specific examples thereof are a propylene homopolymer, a block copolymer, a random copolymer, and like crystalline polymers. As the propylene copolymer, those containing 75 wt % or more propylene may be preferred because they maintain the crystallinity, the rigidity, and the chemical resistance which are characteristics of the polypropylene-based resin. Examples of copolymerizable α-olefin are those having 2 or 4 to 12 carbon atoms such as ethylene, 1-buten, isobutene, 1-pentene, 3-methyl-1-butene, 1-hexene, 4-methyl-1-penetene, 3,4-dimethyl-1-butene, 1-heptene, 3-methyl-1-hexene, 1-octene, and 1-decen; cyclic olefin such as cyclopentene, norbornene, and tetracyclo[6,2,1$^{1,8}$,1$^{3,6}$]-4-dodecen; diene such as 5-methylene-2-norbornene, 5-ethylidene-2-norbornene, 1,4-hexadiene, methyl-1,4-hexadiene, and 7-methyl-1,6-octadinene; a vinyl monomer such as vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methylstyrene, vinyltoluene, and divinylbenzene the above, ethylene and 1-butene are preferred in view of improvement in brittle resistance at low temperature and low cost.

The modified polypropylene-based resin (B) to be used in this invention has a melt flow rate of from 0.1 g/10 min. to less than 10 g/10 min., preferably from 0.3 g/10 min. to 5 g/10 min and a melt tension of 5 cN or more, preferably 8 cN or more as well as exhibits a strain hardening property. In the case where the modified polypropylene-based resin (B) has the melt flow rate and the melt tension of the above ranges and exhibits the strain hardening property, a dispersibility thereof into the liner polypropylene-based resin (A) is satisfactory, a transcription property thereof to a die cavity is satisfactory, and a foam breakage at the top of a melt resin flow during the injection molding is prevented; therefore, it is possible to prevent silver streaks and to obtain a foamed molded article having a uniformly fine cell, a glossy surface appearance, and an expansion ratio of 2 or more.

Also, an effect of the strain hardening property of the modified polypropylene-based resin (B) is to prevent the silver streaks otherwise caused by foam breakage at the top of the melt resin flow during an injection molding and to facilitate to obtain the glossy surface appearance and the foamed molded article having a high expansion ratio exceeding 2.

As used herein, the strain hardening property is defined as an increase in viscosity along with an increase in drawing strain of a melted substance and is ordinarily determined by the method disclosed in JP-A-62-121704, i.e., by plotting relationship between an elongational viscosity measured by a commercially available rheometer and time. Also, it is possible to judge the strain hardening property from a breakage behavior of a melt strand at the time of a measurement of the melt tension. More specifically, if the melt tension is increased sharply when the withdrawal speed is increased, it is determined that the strain hardening property is exhibited.

Examples of the modified polypropylene-based resin (B) are those containing a branch structure obtainable by irradiating a linear polypropylene-based resin with radioactive rays or by melt-kneading a linear polypropylene-based resin, a radical polymerization initiator and a conjugated diene compound, or containing a polymer component. Among the above, in this invention, the modified polypropylene-based resin obtainable by melt-kneading the linear polypropylene-based resin, the radical polymerization initiator and the conjugated diene compound is preferred for the reason that it is prepared at a low cost because it does not require an expensive radiological installation. Examples of a row material polypropylene-based resin to be used for preparing the modified polypropylene-based resin (B) are the same as those used for preparing the linear polypropylene-based resin (A).

Examples of the conjugated diene compound are butadiene, isoprene, 1,3-heptadiene, 2,3-dimethylbutadiene, 2,5-dimethyl-2,4-hexadiene, and the like, which may be used alone or in combination. Among the above, butadiene and isoprene are particularly preferred since they are obtainable at a low cost and easy to use and enable the reaction to progress uniformly.

An amount of the conjugated diene compound to be added may preferably be from 0.01 to 20 parts by weight, more preferably from 0.05 to 5 parts by weight to 100 parts by weight of the linear polypropylene-based resin. An effect of modification is not achieved in some cases when the amount is less than 0.01 part by weight, while the effect is uneconomically saturated in some cases when the amount exceeds 20 parts by weight.

A monomer which is copolymerizable with the conjugated diene compound may be used in combination, and examples of the monomer may be vinyl chloride, vinylidene chloride, acrylonitrile, methacrylonitrile, acrylamide, methacrylamide, vinyl acetate, acrylic acid, methacrylic acid, maleic acid, maleic anhydride, acrylic acid metal salt, methacrylic acid metal salt, acrylic acid ester such as methyl acrylate, ethyl acrylate, butyl acrylate, 2-ethylhexyl acrylate, and stearyl acrylate; methacrylic acid ester such as methyl methacrylate, ethyl methacrylate, butyl methacrylate, 2-ethylhexyl methacrylate, and stearyl methacrylate; and the like.

Typical examples of the radical polymerization initiator are peroxide, an azo compound, and the like, and those capable of extracting hydrogen from the polypropylene-based resin and the conjugated diene compound, such as organic peroxide, may preferably be used. Typical examples of the organic peroxide are ketone peroxide, peroxyketal, hydroperoxide, dialkylperoxide, diacylperoxide, peroxydicarbonate, and peroxyester. Among the above, those particularly high in hydrogen extraction ability may preferably be used, and one or two selected from peroxyketal such as 1,1-bis(t-butylperoxy)3,3,5-trimethylcyclohexane, 1,1-bis(t-butylperoxy)cyclohexane, n-butyl 4,4-bis(t-butylperoxy)valerate, and 2,2-bis(t-butylperoxy)butane; diacylperoxide such as dicumylperoxide, 2,5-dimethyl-2,5-di(t-butylperoxy)hexane, α,α'-bis(t-butylperoxy-m-isopropyl)benzene, t-butylcumylperoxide, di-t-butylperoxide, and 2,5-dimehtyl-2,5-di (t-butylperoxy)hexine-3; diacylperoxide such as benzoylperoxide; peroxyester such as t-butylperoxyoctate, t-butylperoxyisobutylate, t-butylperoxylaurate, t-butylperoxy 3,5,5-trimethylhexanoate, t-butylperoxyisopropylcarbonate, 2,5-dimethyl-2,5-di(benzoylperoxy)hexane, t-butylperoxyacetate, t-butylperoxybenzoate, and di-t-butylperoxyisophthalate; and the like may be used.

An amount of the radical polymerization initiator to be added may preferably be from 0.01 parts by weight to 10 parts by weight, more preferably be from 0.05 parts by weight to 2 parts by weight with respect to 100 parts by weight of the linear polypropylene-based resin. It is difficult to achieve the modification effect in some cases when the amount is less than 0.01 part by weight, while the modification effect is uneconomically saturated in some cases when the amount exceeds 10 parts by weight.

Examples of an apparatus to be used for reacting the linear polypropylene-based resin, the conjugated diene compound, and the radical polymerization initiator include a kneading machine such as a roller, a cokneader, a banbury mixer, a brabender, a monoaxial extruder, and a biaxial extruder; a horizontal stirrer such as a biaxial surface renovating machine and a biaxial multiple shake table device; a vertical stirrer such as a double helical ribbon stirrer; and the like. Among the above, the kneading machine may preferably be used, and the extruder may more preferably be used from the standpoint of productivity.

No particular limitation is imposed on the order and the method of mixing and kneading (stirring) the linear polypropylene-based resin, the conjugated diene compound, and the radical polymerization initiator. The linear polypropylene-based resin, the conjugated diene compound, and the radical polymerization initiator may be melt-kneaded (stirred) after being mixed or the polypropylene-based resin is melt-kneaded (stirred) and then the conjugated diene compound or the radical initiator are mixed with the polypropylene-based resin simultaneously or separately at one time or in several batches. A temperature of the kneader (stirrer) may preferably be from 130° C. to 300° C. because the linear polypropylene-based resin is melted but not thermally decomposed at the temperature. A kneading time may preferably be from 1 to 60 minutes.

Thus, it is possible to prepare the modified polypropylene-based resin (B) to be used in this invention.

A shape and a size of each of the polypropylene-based resins (A) and (B) are not limited, and each of them may be in the form of pellets.

In the polypropylene-based resin composition for injection foam molding of this invention, a content of the linear polypropylene-based resin (A) in 100 parts by weight of a mixture of the linear polypropylene-based resin (A) and the modified polypropylene-based resin (B) is from 50 parts by weight to 95 parts by weight, preferably from 60 parts by weight to 90 parts by weight. A content of the modified polypropylene-based resin (B) is 5 to 50 parts by weight, preferably 10 to 40 parts by weight. With the above mixing amounts, it is possible to prevent the short shot in molding even an article having a thin portion and to provide a foamed molded article having uniformly fine cells and expanded to double or more in size at a low cost.

It is possible to obtain the polypropylene-based resin composition for injection foam molding by mixing the linear polypropylene-based resin (A) and the modified polypropylene-based resin (B). The mixing method is not particularly limited, and it is possible to employ a known method such as a method of dry blending or melt-mixing the resins in the form of pellets using a blender, a mixer, or the like and a method of dissolving the resins into a solvent followed by mixing. In this invention, it is preferable to employ the method of subjecting the resins to injection foam molding after dry blending owing to less thermal history and less reduction in melt tension.

The foamed molded article of this invention is a molded article obtainable by supplying the polypropylene-based resin composition for injection foam molding and a foaming agent into an injection molding machine, followed by injection into a die to achieve a foam molding.

The foaming agent usable in this invention is not particularly limited so far as it is usable for ordinary injection foam moldings, such as a chemical foaming agent and a physical foaming agent. The chemical foaming agent is mixed with the resin composition to be supplied to the injection molding machine and generates a gas such as carbon dioxide as being decomposed inside a cylinder. Examples of the chemical foaming agent are a inorganic chemical foaming agent such as sodium bicarbonate and ammonium carbonate and an organic chemical foaming agent such as azodicarbonamide and N,N'-dinitrosopentatetramine. Among the above, the inorganic chemical foaming agents are preferred for the reasons of coloring resistance, less decomposition residue, readiness of foam refinement, and so forth. An auxiliary foaming agent such as organic acid, e.g. citric acid or the like, and a nucleating agent such as inorganic fine particles, e.g. talc or lithium carbonate, may be added to the inorganic chemical foaming agent in order to stably and uniformly refine the foam of the foamed molded article. In the case of using the inorganic chemical foaming agent, it is generally preferable to use the inorganic chemical foaming agent as a master batch of a polyolefin resin having a concentration of 10 to 50 wt % from the view point of tractability, storage stability, and dispersibility into polypropylene-based resins. Though an amount of the inorganic chemical foaming agent to be added varies depending on its type and its concentration in the master batch, the inorganic chemical foaming agent may preferably be used in an amount of from 0.1 part by weight to 20 parts by weight, more preferably from 0.5 part by weight to 10 parts by weight with respect to 100 parts by weight of the polypropylene-based resin of this invention.

The physical foaming agent is injected into a melt resin in a cylinder of a molding machine in the form of a gas or a supercritical fluid to be dispersed or dissolved and functions as a foaming agent when released from pressure after being injected into a die. Examples of the physical foaming agent are aliphatic hydrocarbons such as propane, butane, and; alicyclic hydrocarbons such as cyclobutane, cyclopentene; halogenated hydrocarbon such as chlorodifluoromethane, dichloromethane; and inorganic gases such as nitrogen, carbon dioxide, air. These physical foaming agents may be used alone or in combination of two or more. Though an amount of the physical foaming agent to be used varies depending on a type of the foaming agent and a desired expansion ratio, the physical foaming agent may preferably be used in an amount of from 0.05 wt % to 10 wt %, more preferably from 0.1 wt % to 5 wt %, still more preferably from 0.2 wt % to 3 wt %. By using the chemical foaming agent and the physical foaming agent in the amounts described above, it is possible to economically achieve an expansion ratio of 2 or more and to readily obtain a foamed molded article having uniformly fine cells, and, also, because the foaming agent is not used in an excessive amount, it is possible to minimize the occurrence of silver streaks.

Further, a stabilizer such as an antioxidant, a metal deactivator, a phosphoric processing stabilizer, an ultraviolet absorber, an ultraviolet stabilizer, a fluorescence brightening agent, a metallic soap, and an antacid absorbent and an additive such as a crosslinking agent, a chain transfer agent, a nucleating agent, a lubricant, a plasticizer, a filler, a reinforcing agent, a pigment, a dye, a flame retarder, and an antistatic agent may be used in combination when so required so far as they do not lessen the effect of this invention. It is needless to say that each of these additives used as required is used insofar as it does not lessen the effect of this invention, and the additive may preferably be used in an amount of from 0.01 part by weight to 10 parts by weight with respect to 100 parts by weight of the polypropylene-based resin composition.

Next, a specific example of the injection foam molding method will be described. Any known method may be employed as the molding method with molding conditions being adjusted appropriately depending on an MFR (melt flow rate) of each of the polypropylene-based resins, type of the foaming agent, type of the molding machine, or shape of the die. In the case of using polypropylene-based resins in general, the molding is performed under the conditions of a resin temperature of 170 to 250° C., a die temperature of 10 to 100° C., a molding cycle of 1 to 60 minutes, an injection speed of 10 to 300 mm/sec., an injection pressure of 10 to 200 MPa, and so forth. Also, the injection can be performed in two stages, and the two stage injection is more preferable since it is possible to achieve a more glossy appearance and a higher expansion ratio by forming a non-foamed layer by filling the die fully in a first injection and then filling the resin to be used for a foamed layer in a second injection.

In this invention, in order to readily mold an article having an glossy appearance, it is more preferable to employ a so-called counter pressure method wherein a melt-kneaded polypropylene-based resin which has been mixed with a foaming agent in a molding machine is injected into a die pressurized with a gaseous substance to a pressure preventing foaming at a flow front. In this case, it is preferable to maintain the pressure inside the die during the pressurizing, and it is generally desirable to prevent the gas from leaking out of the die by inserting an O-ring or the like into a die separation portion or a sliding portion.

Though the gaseous substance to be used for pressurizing the inside of the die is not particularly limited so far as it prevents the foaming at the flow front of the melt resin by pressurizing, it is preferable to use an inorganic gas, particularly nitrogen or carbon dioxide, from the view point of low cost and tractability.

The pressure for pressurizing the inside of the die varies depending on the type of the polypropylene-based resin to be used and the amount of the foaming agent, it is preferable to set the pressure as low as possible in the range that enables a surface modification effect in order to simplify the structure of a gas supplying device. In this invention, since it is possible to obtain a high expansion ratio and to minimize the occurrence of the silver streaks with a relatively low amount of the foaming agent, a satisfactory effect is achieved with a relatively low pressure. More specifically, the pressure may preferably be in the range of from 0.1 MPa to 5 MPa, more preferably of from 0.2 MPa to 3 MPa. The satisfactory foaming prevention effect at the flow front is not exhibited and the silver streaks tend to be formed on a surface of the molded article at a pressure of less than 0.1 MPa, while the gas exhaust from the die is not performed smoothly in some cases and a depression due to the residual gas in the die tends to be formed on the molded article surface at a pressure exceeding 5 MPa. With the applied pressure being in the above described range, timing for the gas exhaust from the die is not particularly limited, and, in general, the timing may appropriately be set to a time point during a period from a start to a completion of the injection. More specifically, the silver streak reduction effect is exhibited if the exhaust is performed concurrently with the start of injection, and the depression on the surface due to the exhaust insufficiency is not formed if the exhaust is performed concurrently with the completion of injection. Further, by setting the pressure to be applied to 1 MPa or less, it is possible to prevent the gas leakage or to suppress the gas leakage to the slightest amount without the O-ring or the like; therefore, it is possible to maintain the pressure inside the die and to simplify the die structure. Furthermore, in the case where a low counter pressure will do as in this invention, it is possible to maintain the pressure inside the die without using a special booster though it is necessary to separately provide a mechanism for exhausting the gas from the die at a desired timing, and it is possible to keep the inside of the die pressurized by using a gas supplied from a commercially available gas container, for example.

A variety of methods of foaming inside the die are known, and, among those, it is preferable to employ a so-called core back method (Moving Cavity method) wherein a die having a fixed die and a movable die capable of advancing and retrieving to arbitrary positions is used for foaming and foaming is performed after a completion of injection with the movable die being retrieved since, with the method, a non-foamed layer is formed on a surface, an internal foamed layer tends to have a high expansion ratio and uniformly fine cells, and a foamed molded article having an glossy appearance, a light weight, and an excellent rigidity is readily obtained.

The foamed molded article of this invention to be obtained as described above has a glossy appearance, a foamed layer preferably having an average cell diameter of 500 μm or less, more preferably 200 μm or less, and a non-foamed layer, which is formed on a surface of at least one side of the foamed layer, preferably having a thickness of from 10 μm to 1,000 μm, more preferably of from 100 μm to 500 μm. Excellent rigidity is not achieved in some cases when the average cell diameter of the foamed layer exceeds 500 μm. The glossy surface appearance is not achieved and the rigidity tends to be reduced when the thickness of the non-foamed layer is less than 10 μm, while the light weight may not be achieved when the thickness exceeds 1,000 μm.

An expansion ratio of the foamed molded article of this invention may preferably be from 2 to 10, more preferably from 3 to 6, and a thickness of the foamed molded article of this invention may preferably be from 30 mm or less, more preferably 10 mm or less. It is in some cases difficult to achieve the light weight when the expansion ratio is less than 2, while a remarkable reduction in rigidity tends to occur when the expansion ratio exceeds 10. As used herein, the expansion ratio is a value obtained from a ratio in relative density of a foamed molded article of the polypropylene-based resin composition for injection foam molding to a non-foamed molded article obtained by an injection molding under the same conditions of the foamed molded article except for an omission of the foaming agent.

This invention will hereinafter be described in more details according to examples, but this invention is not limited by the examples at all.

Experiment methods and judgment standards used in the examples and comparative examples for various evaluations are as follows.

(1) Expansion Ratio: A test specimen including a non-foamed layer formed on a surface was cut from each of foamed molded articles, and a ratio in specific density of the test specimen to a non-foamed molded article (Reference Example 1) produced separately and having a thickness of 3 mm was calculated.

(2) Average Cell Diameter and Thickness of Non-Foamed Layer: A microscopic picture of a section obtained by cutting each of the foamed molded articles in a direction of its thickness was used. The average cell diameter was obtained by calculating an average of 20 cells selected arbitrarily. The thickness of the non-foamed layer was obtained by calculating an average of a thickness of the layer at the side of a movable die and a thickness of the layer at the side of a fixed die.

(3) Thickness of Molded Article: An average of thicknesses of both ends and a central portion of a section obtained by cutting each of the molded articles in the direction of thickness was calculated.

(4) Melt Flow Rate: Measured in accordance with ASTM1238, at a temperature of 230° C., and under a load of 2.16 kg.

(5) Melt Tension: A capirograph (Toyo Seiki Seisaku-Sho, Ltd.) with an attachment for melt tension measurement was used. A strand which had been depressed at a piston depression speed of 10 mm/min. was withdrawn from a dice having a diameter of 1 mm and a length of 10 mm at 230° C., and then the withdrawal speed was increased by 40 m/min.² after stabilization. A load on a pulley with a load cell when the strand was broken was measured as the melt tension.

(6) Strain Hardening Property: In the case where the breakage occurred due to a rapid increase in withdrawal load when the withdrawal speed was increased in the melt tension measurement, the case was evaluated as "exhibiting strain hardening property", if not, the case was evaluated as "not exhibiting strain hardening property".

(7) Injection Foam Moldability: The number of articles resulted in short shot (number of defective articles) in continuous 20 moldings was used for the evaluation as follows.

The number of defective articles was 0 . . . ○
The number of defective articles was 1 to 2 . . . Δ
The number of defective articles was not less than three . . . ×

(8) Surface Appearance: A surface appearance of each of the foamed molded articles (degrees of silver streaks and surface non-uniformity) was compared with the non-foamed molded article (Reference Example 1) prepared separately and having a thickness of 3 mm for the evaluation as follows.

The degrees were identical with those of the non-foamed molded article . . . ○

Silver streaks and surface non-uniformity were detected on ends of the molded article . . . Δ

Silver streaks and surface non-uniformity were detected on all over the molded article . . . ×

(9) Internal Void: A section obtained by cutting each of the foamed molded articles in the direction of thickness was observed to investigate if there was a void having the size of 1 mm or more in the foamed layer.

No internal void . . . ○
Internal void was detected . . . ×

(10) Rigidity: A flexural rigidity (G) of a test piece cut in such a fashion that a longitudinal direction thereof was at the right angle with an injection resin flow direction was obtained from a sectional secondary moment (I) and a flexural elastic modulus (E) using the following equation:

$$G = EI \quad (1)$$

Here, the secondary moment of area (I) is represented by the following equation using width (b) and a thickness (h) of the test piece:

$$I = \frac{bh^3}{12} \quad (2)$$

The rigidity was evaluated through a comparison with a rigidity of a test piece cut from the non-foamed molded article (reference Example 1) separately prepared and having the thickness of 3 mm on a two-point scale as follows.

Rigidity equivalent or superior to the non-foamed molded article . . . ○

Rigidity inferior to the non-foamed molded article . . . ×

Next, polypropylene-based resins and foaming agents used in Examples and Comparative Examples are listed below.

(A) Linear Polypropylene-based Resins

PP-1: J707 manufactured by Grand Polymer Co., Ltd. (propylene-ethylene block copolymer, melt flow rate: 23 g/10 min., melt tension: 1 cN or less).

PP-2: PM600A manufactured by SunAllomer, Ltd. (homopolymer, melt flow rate: 7.5 g/10 min., melt tension: 1 cN or less).

(B) Modified Polypropylene-based Resins

MP-1: A modified polypropylene-based resin (melt flow rate: 0.5 g/10 min., melt tension: 12 cN, exhibiting strain hardening property) obtained by water cooling and beating a strand obtained by supplying a mixture of a linear polypropylene-based resin (100 parts by weight of a propylene homopolymer) having a melt flow rate of 3 g/10 min. and a radical polymerization initiator (0.3 part by weight of t-butylperoxyisopropylcarbonate) at a rate of 50 kg/hour from a hopper of a biaxial extruder having a diameter of 44 mm φ (L/D=38) while supplying an isoprene monomer from an introducing unit provided en route at a rate of 0.25 kg/hour using a continuous flow pump.

MP-2: A modified polypropylene-based resin (melt flow rate: 4 g/10 min., melt tension: 9 cN, exhibiting strain hardening property) obtained in the same manner as described above except for using a polypropylene homopolymer having a melt flow rate of 9 g/10 min. as a linear polypropylene-based resin and changing the amount of the radical polymerization initiator to 0.4 part by weight, and changing the supply rate of the isoprene monomer to 1 kg/hour.

MP-3: PF814 manufactured by SunAllomer, Ltd. (homopolymer, melt flow rate: 3 g/10 min., melt tension: 10 cN or less, exhibiting strain hardening property).

MP-4: PF611 manufactured by SunAllomer, Ltd. (homopolymer, melt flow rate: 30 g/10 min., melt tension: 1 cN or less, exhibiting strain hardening property).

MP-5: FH6000 manufactured by Chisso Corporation (homopolymer, melt flow rate: 0.5 g/10 min., melt tension: 7 cN or less, not exhibiting strain hardening property).

(C) Foaming Agents

BA-1: Polythlene EE275 manufactured by Eiwa Chemical Ind. Co., Ltd. (decomposition temperature: 155° C., decomposition gas amount: 40 ml/g, master batch of low density polyethylene).

BA-2: Polythlene PEM30S manufactured by Eiwa Chemical Ind. Co., Ltd. (decomposition temperature: 155° C., decomposition gas amount: 30 ml/g, master batch of low density polyethylene).

BA-3: Carbon dioxide having a purity of 99% or more.

EXAMPLES 1 TO 6

The linear polypropylene-based resin (A), the modified polypropylene-based resin (B), and the inorganic chemical foaming agent were dry blended at a composition ratio shown in Table 1 to obtain a polypropylene-based resin composition for injection foam molding.

A flat plate having a height of 310 mm and a width of 190 mm was obtained by injection foam molding pellets of the thus-obtained resin composition using an injection foam molding machine MD350S-IIIDP manufactured by Ube Kosan Co., Ltd. A die having a gate structure for the center of a molded article, a cell gate having a diameter of 4 mm, a cavity whose inner surface was craped (textured), and being formed of a fixed die and a movable die capable of advancing and retrieving to arbitrary positions was used. A die temperature of each of the fixed die and the movable die was set to 50° C. An internal die clearance at the time of injection was 2 mm, and the movable die was retrieved immediately after a completion of injection filling to adjust a final internal die clearance, thereby achieving a predetermined thickness of a molded article by foaming. Other molding conditions were a cylinder temperature of 200° C., an injection pressure of 100 MPa, an injection rate of 160 mm/sec., a retrieving rate of the movable die during foaming of 50 mm/sec., and a cooling time of 90 seconds.

Moldabilities, shapes, and properties of the obtained foamed molded articles are shown in Table 2. Since the polypropylene-based resin composition of this invention is excellent in fluidity, short shot hardly occurred in continuous moldings, and injection foam moldability was satisfactory. The obtained foamed molded articles had a molded article thickness of 4.2 to 8.4 mm and an expansion ratio of 2.1 to 4.1, thereby achieving a high expansion ratio and excellently light weight. A foamed layer had an average cell diameter of 200 μm or less and a non-foamed layer (skin layer) of 200 to 400 μm, and no void was observed in the foamed layer. As a result, each of the foamed molded articles had a surface appearance in a craped surface and a rigidity which are equivalent or superior to those of the non-foamed molded article of Reference Example 1 prepared separately by injection molding and having a thickness of 3 mm. In addition, a reduction in weight of each of the foamed molded articles of Examples with respect to the non-foamed molded article of Reference Example 1 was 33%.

REFERENCE EXAMPLE 1

A non-foamed molded article was obtained in the same manner except for an omission of the modified polypropylene-based resin and the inorganic chemical foaming agent, changing the initial cavity clearance to 3 mm, and cooling after a completion of injection filling for 90 seconds. Results are shown in Table 2.

COMPARATIVE EXAMPLE 1

Prepared in the same manner as in Example 3 except for an omission of the modified polypropylene-based resin. Results are shown in Table 2. Voids were generated in an internal of a foamed layer of this molded article when an expansion ratio was 2 to reduce its rigidity.

COMPARATIVE EXAMPLE 2

Prepared in the same manner as in Example 3 except for using PP-2 as the linear polypropylene-based resin. Results are shown in Table 2. Four short shots occurred in 20 shots in a continuous molding (defective ratio: 20%), thereby revealing inferiority in injection foam moldability.

COMPARATIVE EXAMPLE 3

Prepared in the same manner as in Example 3 except for using MP-4 (whose melt tension is outside the range of this invention) as the modified polypropylene-based resin. Results are shown in Table 2. Voids were generated in an internal of a foamed layer of this molded article when an expansion ratio was 2 to reduce its rigidity.

COMPARATIVE EXAMPLE 4

Prepared in the same manner as in Example 3 except for using MP-5 (which does not exhibit the strain hardening property of this invention) as the modified polypropylene-based resin. Results are shown in Table 2. Voids were generated in an internal of a foamed layer of this molded article when an expansion ratio was 2 to reduce its rigidity.

COMPARATIVE EXAMPLE 5

Prepared in the same manner as in Example 3 except for an omission of the linear polypropylene-based resin. Results are shown in Table 2. Five short shots occurred in 20 shots in a continuous molding (defective ratio: 25%), thereby revealing inferiority in injection foam moldability. The thus-obtained foamed molded article was inferior in surface appearance with non-uniformity on a surface thereof.

TABLE 1

| | Linear Polypropylene-based Resin (A) | | Modified Polypropylene-based Resin (B) | | Inorganic Chemical Foaming Agent | |
|---|---|---|---|---|---|---|
| | Type | Parts by Weight | Type | Parts by Weight | Type | Parts by Weight |
| Ex. 1 | PP-1 | 90 | MP-1 | 10 | BA-1 | 2 |
| Ex. 2 | PP-1 | 80 | MP-1 | 20 | BA-2 | 5 |
| Ex. 3 | PP-1 | 70 | MP-2 | 30 | BA-1 | 5 |
| Ex. 4 | PP-1 | 70 | MP-2 | 30 | BA-2 | 7.5 |
| Ex. 5 | PP-1 | 60 | MP-2 | 40 | BA-1 | 7.5 |
| Ex. 6 | PP-1 | 70 | MP-3 | 30 | BA-1 | 5 |
| Ref. Ex. 1 | PP-1 | 100 | — | — | — | — |
| Comp. Ex. 1 | PP-1 | 100 | — | — | BA-1 | 5 |
| Comp. Ex. 2 | PP-2 | 70 | MP-2 | 30 | BA-1 | 5 |
| Comp. Ex. 3 | PP-1 | 70 | MP-4 | 30 | BA-1 | 5 |
| Comp. Ex. 4 | PP-1 | 70 | MP-5 | 30 | BA-1 | 5 |
| Comp. Ex. 5 | — | — | MP-2 | 100 | BA-1 | 5 |

TABLE 2

| | Injection Foam Moldability | Thickness of Molded Article (mm) | Expansion ratio | Internal Void | Average Cell Diameter (μm) | Thickness of Non-Foamed Layer (mm) | Surface Appearance | Rigidity |
|---|---|---|---|---|---|---|---|---|
| Ex. 1 | ○ | 4.2 | 2.1 | ○ | 140 | 400 | ○ | ○ |
| Ex. 2 | ○ | 5.1 | 2.5 | ○ | 160 | 400 | Δ | ○ |
| Ex. 3 | ○ | 6.5 | 3.2 | ○ | 120 | 300 | ○ | ○ |
| Ex. 4 | ○ | 7.6 | 3.7 | ○ | 180 | 300 | Δ | ○ |
| Ex. 5 | Δ | 8.4 | 4.1 | ○ | 160 | 200 | ○ | ○ |
| Ex. 6 | ○ | 6.1 | 3.0 | ○ | 110 | 300 | ○ | ○ |
| Ref. Ex. 1 | ○ | 3.0 | 1 | — | — | — | ○ | — |
| Comp. Ex. 1 | ○ | 4.1 | 2.0 | x | 220 | 300 | ○ | x |
| Comp. Ex. 2 | x | 5.7 | 2.8 | ○ | 140 | 300 | ○ | ○ |
| Comp. Ex. 3 | ○ | 4.5 | 2.2 | x | 280 | 300 | ○ | x |
| Comp. Ex. 4 | Δ | 3.7 | 1.8 | x | 300 | 300 | ○ | x |
| Comp. Ex. 5 | x | 6.8 | 3.4 | ○ | 180 | 300 | x | ○ |

EXAMPLES 7 TO 10

Used as an injection molding machine was MD350S-IIIDP manufactured by Ube Kosan Co., Ltd. having a shut off nozzle mechanism at the tip of a cylinder, and a die cavity having a direct sprue gate, a movable flat plate-shaped cavity having a height of 250 mm and a width of 200 with a thickness being variable by justification, an inner mirror finished surface, and an O-ring inserted into a sliding surface of a movable/fixed die was used. A foam molding was conducted under the molding conditions of a resin temperature of 200° C., a die temperature of 50° C., an injection rate of 100 mm/sec., a back pressure of 5 MPa, a cooling time of 90 seconds, and a retrieval rate of the movable die during foaming of 50 mm/sec.

More specifically, a polypropylene-based resin mixture for injection foam molding obtained by dry blending the linear polypropylene-based resin (A), the modified polypropylene-based resin (B), and the inorganic chemical foaming agent at a composition ratio shown in Table 3 was supplied, the die maintained at a counter pressure shown in Table 3 with carbon dioxide and having a clearance of 2 mm was filled with the polypropylene-based resin mixture by injection filling, and then the gas in the die was exhausted at the timing shown in Table 3, followed by retrieving the movable die immediately after a completion of the filling, thereby foaming the polypropylene-based resin mixture with a final internal clearance being adjusted to achieve a predetermined thickness of a molded article.

EXAMPLES 11 AND 12

The injection molding machine used in Examples 7 to 10 was replaced with a bent type molding machine (having a bent port near the center of a cylinder) capable of pressuring a bent portion with carbon dioxide. The amount of carbon dioxide to be supplied to a melt resin was controlled by using a carbon dioxide supplying machine MAC-100 manufactured by Asahi Engineering Co. Ltd. and by supplying carbon dioxide with a constant pressure.

Foamed molded articles were obtained in the same manner as in Examples 7 to 10 except for dry blending the linear polypropylene resin (A) and the modified polypropylene resin (B) with 0.5 part of BA-1 being added as a nucleating agent, supplying the thus-obtained polypropylene resin mixture for injection foam molding to the injection foam molding machine, and supplying carbon dioxide as a foaming agent with a pressure at the bent portion of the molding machine being set to a value shown in Table 4.

Moldabilities, shapes, and properties of the obtained foamed molded articles in Examples 7 to 12 are shown in Tables 5 and 6. Since the polypropylene-based resin composition of this invention is excellent in fluidity and forming property, short shot hardly occurred in continuous molding, and injection foam moldability was satisfactory. It is possible to further improve a surface appearance of the polypropylene-based resin composition of this invention by employing a counter pressure method. The foamed molded articles obtained by the molding method had a glossy surface appearance with a specular gloss and little or no silver streaks, a molded article thickness of 4.3 to 8.2 mm, and an expansion ratio of 2.1 to 4.0, thereby achieving a high expansion ratio and an excellently light weight. A foamed layer had an average cell diameter of 300 μm or less and a non-foamed layer (skin layer) of 300 μm, and no void was observed in the internal of the molded article. As a result, it is understood that each of the foamed molded articles had a surface appearance and a rigidity equivalent or superior to those of the non-foamed molded article of Reference Example 1 prepared separately by injection molding and having a thickness of 3 mm.

COMPARATIVE EXAMPLE 6

A foamed molded article was obtained in the same manner as in Example 8 except for an omission of the modified polypropylene-based resin. Results are shown in Table 5. Voids were generated in an internal of a foamed layer of this molded article when an expansion ratio was 2 to reduce its rigidity.

COMPARATIVE EXAMPLE 7

A foamed molded article was obtained in the same manner as in Example 8 except for using the linear polypropylene-based resin PP-2. Results are shown in Table 5. Three short shots occurred in 20 shots in a continuous molding (defective ratio: 15%) thereby revealing inferiority in injection foam moldability.

COMPARATIVE EXAMPLE 8

A foamed molded article was obtained in the same manner as in Example 8 except for using the modified polypropylene-based resin MP-4 (whose melt tension is outside the range of this invention). Results are shown in Table 5. Voids were generated in an internal of a foamed layer of this molded article when an expansion ratio was 2 to reduce its rigidity.

COMPARATIVE EXAMPLE 9

A foamed molded article was obtained in the same manner as in Example 8 except for using the modified polypropylene-based resin MP-5 (which does not have the strain hardening property of this invention). Results are shown in Table 5. Voids were generated in an internal of a foamed layer of this molded article when an expansion ratio was 2 to reduce its rigidity.

COMPARATIVE EXAMPLE 10

A foamed molded article was obtained in the same manner as in Example 8 except for an omission of the linear polypropylene-based resin. Results are shown in Table 5. Four short shots occurred in 20 shots in a continuous molding (defective ratio: 20%), thereby revealing inferiority in injection foam moldability.

COMPARATIVE EXAMPLE 11

A foamed molded article was obtained in the same manner as in Example 11 except for an omission of the modified polypropylene-based resin. This comparative example corresponds to the mode disclosed in JP-A-2002-192549. Results are shown in Table 6. Voids were generated in an internal of a foamed layer of this molded article when an expansion ratio was 2 to reduce its rigidity. The obtained molded article had depressions on its surface. It is thus revealed that it is impossible to obtain a polypropylene-based resin foamed molded article having a high expansion ratio, rigidity, and an glossy surface by employing only the conventional counter pressure method.

TABLE 3

| | Linear Polypropylene-based Resin (A) | | Modified Polypropylene-based Resin (B) | | Inorganic Chemical Foaming Agent | | Counter Pressure | |
|---|---|---|---|---|---|---|---|---|
| | Type | Parts by Weight | Type | Parts by Weight | Type | Parts by Weight | MPa | Exhaust* |
| Ex. 7 | PP-1 | 80 | MP-1 | 20 | BA-1 | 5 | 0.5 | A |
| Ex. 8 | PP-1 | 70 | MP-2 | 30 | BA-1 | 7.5 | 0.5 | B |
| Ex. 9 | PP-1 | 60 | MP-2 | 40 | BA-1 | 9 | 1.5 | C |
| Ex. 10 | PP-1 | 70 | MP-2 | 30 | BA-1 | 7.5 | 3 | C |
| Ref. Ex. 1 | PP-1 | 100 | — | — | — | — | — | — |
| Comp. Ex. 6 | PP-1 | 100 | — | — | BA-1 | 7.5 | 0.5 | B |
| Comp. Ex. 7 | PP-2 | 70 | MP-2 | 30 | BA-1 | 7.5 | 0.5 | C |
| Comp. Ex. 8 | PP-1 | 70 | MP-3 | 30 | BA-1 | 7.5 | 0.5 | A |
| Comp. Ex. 9 | PP-1 | 70 | MP-4 | 30 | BA-1 | 7.5 | 0.5 | B |
| Comp. Ex. 10 | — | — | MP-2 | 100 | BA-1 | 7.5 | 0.5 | C |

*Exhaust: timing at which the gas used for pressurizing the die was exhausted.
A . . . Exhaust at the start of injection.
B . . . Exhaust when the injection was half proceeded (when a half of the die was filled with the melt resin).
C . . . Exhaust at the completion of injection (when the die was filled fully with the melt resin).

TABLE 4

| | Linear Polypropylene-based Resin (A) | | Modified Polypropylene-based Resin (B) | | Inorganic Chemical Foaming Agent | Supplied pressure | Counter Pressure | |
|---|---|---|---|---|---|---|---|---|
| | Type | Parts by Weight | Type | Parts by Weight | Type | Mpa | MPa | Exhaust* |
| Ex. 11 | PP-1 | 70 | MP-2 | 30 | BA-3 | 1.5 | 1.5 | C |
| Ex. 12 | PP-1 | 70 | MP-2 | 30 | BA-3 | 3 | 3 | C |
| Comp. Ex. 11 | PP-1 | 100 | — | — | BA-3 | 1.5 | 7 | C |

*Exhaust: timing at which the gas used for pressurizing the die was exhausted.
A . . . Exhaust at the start of injection.
B . . . Exhaust when the injection was half proceeded (when a half of the die was filled with the melt resin).
C . . . Exhaust at the completion of injection (when the die was filled fully with the melt resin).

TABLE 5

| | Injection Foam Moldability | Thickness of Molded Article (mm) | Expansion ratio | Internal Void | Average Cell Diameter (μm) | Thickness of Non-Foamed Layer (mm) | Rigidity | Surface Appearance Silver/Depression |
|---|---|---|---|---|---|---|---|---|
| Ex. 7 | ○ | 4.9 | 2.4 | ○ | 130 | 300 | ○ | o/o |
| Ex. 8 | ○ | 7.2 | 3.5 | ○ | 150 | 300 | ○ | o/o |
| Ex. 9 | ○ | 8.2 | 4 | ○ | 140 | 300 | ○ | o/o |
| Ex. 10 | ○ | 7.2 | 3.5 | ○ | 140 | 300 | ○ | o/o |
| Ref. Ex. 1 | ○ | 3 | 1 | — | — | — | — | — |
| Comp. Ex. 6 | ○ | 4.2 | 2 | x | 200 | 300 | x | Δ/Δ |
| Comp. Ex. 7 | x | 7.2 | 3.5 | ○ | 160 | 300 | ○ | o/o |
| Comp. Ex. 8 | ○ | 4.3 | 2.1 | x | 250 | 300 | x | Δ/Δ |
| Comp. Ex. 9 | Δ | 4.2 | 2 | x | 240 | 300 | x | Δ/Δ |
| Comp. Ex. 10 | x | 7.8 | 3.8 | ○ | 170 | 300 | ○ | o/Δ |

TABLE 6

| | Injection Foam Moldability | Thickness of Molded Article (mm) | Expansion ratio | Internal Void | Average Cell Diameter (μm) | Thickness of Non-Foamed Layer (mm) | Rigidity | Surface Appearance Silver/Depression |
|---|---|---|---|---|---|---|---|---|
| Ex. 11 | ○ | 6.4 | 3.1 | ○ | 210 | 300 | ○ | o/o |
| Ex. 12 | ○ | 6.5 | 3.2 | ○ | 190 | 300 | ○ | o/o |
| Comp. Ex. 11 | ○ | 4.4 | 2.1 | x | 230 | 300 | x | o/x |

INDUSTRIAL APPLICABILITY

The polypropylene-based resin composition for injection foam molding of this invention is satisfactory in injection foam moldability, and a foamed molded article obtained from the polypropylene-based resin composition has an glossy surface and is excellent in lightweightness and rigidity; therefore, it is possible to use the polypropylene-based resin composition for a wide variety of applications such as an interior material for vehicles, a container for packaging foods, home appliances, and a building material.

The invention claimed is:

1. A process for preparing a polypropylene-based resin foamed molded article comprising supplying a polypropylene-based resin composition for injection foam molding and a foaming agent to an injection molding machine and forming a melt mixture and injecting said melt mixture into a die for foam molding, wherein said foam-molding is performed by injecting said melt mixture into a die which is pressurized with a gaseous substance to a pressure preventing foaming at a flow front of the melt mixture and said polypropylene-based resin composition for injection foam molding comprises:

(A) 50 to 95 parts by weight of a linear polypropylene-based resin having a melt flow rate of from 10 g/10 min. to 100 g/10 min. and a melt tension of not more than 2 cN;

(B) 5 to 50 parts by weight of a modified polypropylene having a melt flow rate of from 0.1 g/10 mm. to less than 10 g/10 min. and a melt tension of 5 cN or more and exhibiting a strain hardening property (provided that a total of the linear polypropylene-based resin (A) and the modified polypropylene-based resin (B) is 100 parts by weight).

2. The process for preparing a polypropylene-based resin foamed molded article according to claim 1, wherein the modified polypropylene-based resin (B) is obtained by melt-mixing a linear polypropylene-based resin, a radical polymerization initiator, and a conjugated diene compound.

3. A foamed molded article made by the process of claim 1 or 2.

4. The foamed molded article according to claim 3, comprising:

a foamed layer having an average cell diameter of not more than 500 μm, and a non-foamed layer formed on a surface of at least one side of the foamed layer and having a thickness of from 10 μm to 1,000 μm; and said foamed molded article having an expansion ratio of from 2 to 10, and a thickness of not more than 30 mm.

5. A process for preparing the foamed molded article according to claim 1, wherein said die for foam molding comprises a fixed die and a movable die capable of advancing and retrieving to arbitrary positions and foaming with the movable die being retrieved after the injection.

6. The process for preparing a polypropylene-based resin foamed molded article according to claim 1, wherein the pressure for pressurizing the die in advance of the injection of the melt mixture is from 0.1 MPa to 5 MPa.

* * * * *